(12) United States Patent
Müller

(10) Patent No.: US 12,190,667 B2
(45) Date of Patent: Jan. 7, 2025

(54) FIXEDLY MOUNTED TICKET DETECTION DEVICE FOR AN ACCESS CONTROL SYSTEM

(71) Applicant: Scheidt & Bachmann GmbH, Mönchengladbach (DE)

(72) Inventor: Thomas Müller, Mönchengladbach (DE)

(73) Assignee: Scheidt & Bachmann GmbH, Mönchengladbach (DE)

( * ) Notice: Subject to any disclaimer, the term of this patent is extended or adjusted under 35 U.S.C. 154(b) by 78 days.

(21) Appl. No.: 17/993,185

(22) Filed: Nov. 23, 2022

(65) Prior Publication Data

US 2023/0162550 A1  May 25, 2023

(30) Foreign Application Priority Data

Nov. 25, 2021 (DE) ..................... 10 2021 130 970.0

(51) Int. Cl.
*G07C 9/22* (2020.01)
*G06K 7/14* (2006.01)
(Continued)

(52) U.S. Cl.
CPC ............. *G07C 9/22* (2020.01); *G06K 7/1417* (2013.01); *G07C 9/15* (2020.01); *G08B 7/06* (2013.01)

(58) Field of Classification Search
None
See application file for complete search history.

(56) References Cited

U.S. PATENT DOCUMENTS 11,430,553 B1 * 8/2022 Kocher ................... G16H 40/20
2020/0242869 A1 * 7/2020 Sakaguchi ............. G07C 9/257
(Continued)

FOREIGN PATENT DOCUMENTS

CA    2667378 C  *  2/2011  ....... G06F 17/30905
CA    2799122 A1 *  6/2013  ........... A63F 13/235
(Continued)

OTHER PUBLICATIONS

European Patent Office, Extended European Search Report, Application No. 22206322.4, dated Apr. 18, 2023, 13 pages (in German).
(Continued)

*Primary Examiner* — Fekadeselassie Girma
(74) *Attorney, Agent, or Firm* — Sunstein LLP

(57) ABSTRACT

The application relates to a fixedly mounted ticket detection device (100, 200, 400, 500, 600) of an access control system (560, 660) comprising at least one camera-based detection equipment (102, 202, 402, 502, 602) configured to detect images of a graphical ticket code of a ticket medium (452, 552) in a detection area (108, 208, 408) of the camera-based detection equipment (102, 202, 402, 502, 602) and to generate detected image data from the detected images, at least one evaluation equipment (104, 204) configured at least to obtain the detected image data from the camera-based detection equipment (102, 202, 402, 502, 602) and to extract a data content of the graphical ticket code from the obtained detected image data, and at least one evaluation equipment (104, 204) communicatively coupled to the camera-based detection equipment (102, 202, 402, 502, 602) and configured to obtain the detected image data from the camera-based detection equipment (102, 202, 402, 502, 602) and to display obtained detected image data as images.

12 Claims, 7 Drawing Sheets

(51) Int. Cl.
*G07C 9/15* (2020.01)
*G08B 7/06* (2006.01)

(56) References Cited

U.S. PATENT DOCUMENTS

| | | | |
|---|---|---|---|
| 2021/0265843 A1* | 8/2021 | Baldasare | H04M 1/72409 |
| 2021/0288927 A1* | 9/2021 | Wang | G06K 7/1417 |
| 2022/0172534 A1* | 6/2022 | Tate | G07C 9/00182 |
| 2022/0174244 A1* | 6/2022 | Guibene | G06F 18/21 |
| 2022/0181887 A1* | 6/2022 | Baldasare | G08B 21/182 |
| 2022/0253846 A1* | 8/2022 | Tobb | G06V 30/418 |
| 2022/0255995 A1* | 8/2022 | Berliner | H04W 4/80 |
| 2023/0162550 A1* | 5/2023 | Müller | G08B 7/06 340/5.7 |

FOREIGN PATENT DOCUMENTS

| | | |
|---|---|---|
| CN | 110648433 A | 1/2020 |
| CN | 210895468 U | 6/2020 |
| CN | 210955249 U | 7/2020 |
| CN | 210955250 U | 7/2020 |
| CN | 212873754 U | 4/2021 |
| EP | 3382657 A1 | 10/2018 |
| EP | 3839918 A1 | 6/2021 |
| JP | 2004145519 A * | 5/2004 |
| JP | 2004363797 A * | 12/2004 |
| JP | 2005010929 A * | 1/2005 |
| JP | 2018032161 A * | 3/2018 |
| JP | 4147276 B6 * | 8/2022 |

OTHER PUBLICATIONS

German Patent Office, Office Action that issued in priority application No. 10 2021 130 970.0, dated Jun. 1, 2022, 9 pages (in German).

* cited by examiner

FIXEDLY MOUNTED TICKET DETECTION DEVICE FOR AN ACCESS CONTROL SYSTEM

CROSS-REFERENCE TO RELATED APPLICATIONS

This application claims the benefit of German patent application No. 10 2021 130 970.0 filed Nov. 25, 2021, the disclosure of which are incorporated herein by reference in their entirety.

TECHNICAL FIELD

The application relates to a fixedly mounted ticket detection device for an access control system (resp. of an access lane control system), comprising at least one camera-based detection equipment configured to detect images of a graphical ticket code of a ticket medium in a detection area of the camera-based detection equipment and to generate detected image data from the detected images, and at least one evaluation equipment communicatively coupled to the camera-based detection equipment configured at least to obtain the image data detected by the camera-based detection equipment and to extract a data content of the graphical ticket code from the obtained detected image data. Furthermore, the application relates to a method and an access control system.

BACKGROUND ART

Access control systems (also called access lane control systems in the case of vehicles) for controlling an entrance respectively access from a first area to a second area are known from the prior art. For example, a letting-in (i.e., in particular, a driving-in or an entering) from an uncontrolled area to a controlled area at an inlet (i.e., in particular, an entrance or entry lane) and/or a letting-out (i.e., in particular, a driving-out or going-out) from a controlled area to an uncontrolled area at an outlet (i.e., in particular, an exit or exit lane) may be controlled by means of an access control system according to the application.

An access control system may have at least one gate. In particular, a gate is a passage barrier or a drive through barrier. A gate is configured to selectively block and to selectively allow letting-in (i.e., in particular, a driving-in or an entering) from a first area to a second area. In particular, a gate can ensure that only authorized users can pass through the gate, for example, in order to enter the controlled area and/or to exit from the controlled area.

Access control systems are used, for example, in passenger transport systems or parking systems with a parking area for vehicles, but also in other applications where an authorization of users is to be controlled, such as in sports events, cultural events or leisure events. In this case, access control systems may also be configured to verify an authorization of the user for the stay in a controlled area and to display the result of the verification. In particular, the user may already be in the controlled area while the controlling is being carried out according to the application, such as with a mobile validator equipped according to the application in a bus or in a train or with a stationary validator equipped according to the application on a platform or at an event venue.

Known gates are configured to validate an access authorization of a user prior to enabling a user to pass through the gate. For example, access control systems are known in which a ticket medium of a user is verified prior to a release. A user may have a ticket medium with a ticket code (e.g., magnetic stripe code, graphical ticket code such as a bar code or QR code, RFID identifier, other readable user or mobile device identifier, etc.) readable by an interface equipment of the gate. The ticket code may include as data content at least the access authorization of the user, or an identification of the user that can be used to verify access authorization.

In the initial state, a gate is usually closed. This means that a blocking element of the gate physically prevents a user from passing through or driving through the gate. In other cases, the gate may be open in its initial state and may close only when a user without a valid access authorization respectively ticket code attempts to pass through the gate. Furthermore, gates are known that do not have any blocking elements and that signal the passing through or driving through only visually, for example, barrierless entrances or exits for parking garages. Without limiting generality, it is assumed below that a gate is closed in its initial state and is intended to be opened for the user to pass through or drive through upon positive verification of the user's ticket code.

An access control system, in particular a gate of the access control system, may have at least one fixedly mounted ticket detection device. Known fixedly mounted ticket detection devices comprise at least one camera-based detection equipment configured to detect images of a graphical ticket code (e.g., barcode or QR code) of a ticket medium in a detection area of the camera-based detection equipment and to generate detected image data from the detected images. In other words, it is necessary for a user to hold the graphical ticket code of the ticket medium in the detection area of the camera-based detection equipment such that it can be detected respectively recorded in the form of image data by the detection equipment.

An evaluation equipment is usually communicatively coupled to the camera-based detection equipment. The detected image data is provided to the evaluation equipment. The evaluation equipment is configured at least to extract the data content of the graphical ticket code from the detected image data, in particular, in order to enable a verification of an access authorization.

For example, a (local) evaluation equipment of the ticket detection device of the gate and/or a backend system communicatively coupled to the gate, comprising an output equipment, can verify the extracted data content of the graphical ticket code and release a letting-in of a user from a first to a second area, i.e. a passing through or a driving through a gate, in case of a positive result. If the result is negative and the user is not authorized, the gate remains blocked.

In particular, in order to improve the user-friendliness of access control systems, it is known from the prior art to use mobile terminals, such as smartphones, as ticket media. Here, in particular, an access application in the form of an app can be installed on a mobile terminal of a user. The access application can, in particular, be configured to cause a graphical ticket code to be displayed on a display of the mobile terminal. However, it is further known to use other ticket media, such as paper-based media with a (printed) graphical ticket code.

In particular, when using mobile terminals as ticket media with a graphical ticket code, but also with other ticket media with graphical ticket codes, problems, in particular, delays during the reading process, regularly occur during the detection of the graphical ticket code at the ticket detection device. It has been recognized that these delays are usually based on a presentation error of the user during the presentation of the graphical ticket code at the camera-based detection equipment. Here, a presentation error means, in particular, that the detection device cannot detect respectively record image data that allows successful extraction of the data content of a graphical ticket code of the ticket medium from the detected image data.

In other words, the data content of a graphical ticket code cannot be successfully extracted by the ticket detection device due to the presentation error. To make matters worse, the nature of the presentation error is regularly not apparent to the user due to the orientation of the graphical ticket code (respectively the display on which the ticket code is or is to be presented) to the camera-based detection equipment. That is, the user does not know why a reading fails. This, in turn, prevents a user from taking purposeful action to correct the presentation error. As a result, it is not possible for the user to correct the presentation error in a timely manner.

As has already been described, in particular, the user does not recognize the reason for the unsuccessful read operation, and thus, cannot take any targeted action. The entire process takes a long time, is not comprehensible to the user and is therefore frustrating. In particular, there is a reduction in throughput at a gate or gate array comprising a plurality of (adjacently arranged) gates.

In a passenger transportation system, in particular, the compliance with the schedule may be affected due to the slower passenger boarding process. In a parking system, a backlog may occur.

Therefore, the object of the application is to provide a fixedly mounted ticket detection device for an access control system, in which the disadvantages of the prior art are reduced and, in particular, the throughput at an inlet and/or outlet of the access control system is improved.

SUMMARY OF THE INVENTION

According to a first aspect, the problem is solved by a fixedly mounted ticket detection device for an access control system. The fixedly mounted ticket detection device comprises at least one camera-based detection equipment. The camera-based detection equipment is configured to detect images of a graphical ticket code of a ticket medium in a detection area of the camera-based detection equipment. The camera-based detection equipment is configured to generate detected image data from the detected images. The ticket detection device comprises at least one evaluation equipment communicatively coupled to the camera-based detection equipment. The evaluation equipment is configured at least to obtain the detected image data from the camera-based detection equipment. The evaluation equipment is configured at least to extract a data content of the graphical ticket code from the obtained detected image data. The ticket detection device comprises at least one optical display equipment communicatively coupled to the camera-based detection equipment. The display equipment is configured to obtain the detected image data from the camera-based detection equipment. The display equipment is configured to display the image data detected by the camera-based detection equipment as images.

In contrast to the prior art, according to the application, a fixedly mounted ticketing device for an access control system is provided in which, due to displaying the image data detected by the camera-based detection device as images, a presentation error can be promptly corrected so that the delays in reading graphical ticket codes can be substantially reduced. In other words, the average time duration of a reading operation at a ticket detection device according to the application can be significantly reduced.

The throughput at an inlet and/or outlet of the access control system is improved.

The fixedly mounted ticket detection device is used in an access control system for detecting ticket codes to enable a verification of an access authorization. An access control system according to the application is, in particular, a ticket-based access control system. In such an access control system, the authorization to enter a controlled area or to use a service in a controlled area depends, in particular, on the presence of a valid ticket medium respectively a valid access authorization contained as data content in a graphical ticket code of the ticket medium.

The access control system according to the application serves, in particular, for controlling a utilization of a transportation service or a parking service by controlling the letting-in into a controlled area and/or the letting-out from a controlled area by means of the fixedly mounted ticketing device. A controlled area may preferably be a parking area for motor vehicles, an interior area or inner room of a passenger transportation vehicle (e.g., bus, rail vehicle, watercraft, etc.), an interior area of a transportation building or site, such as a train station, bus stop, etc., or the like. At least one fixedly mounted ticket detection device of the access control system may be arranged at an inlet and/or an outlet of the controlled area.

A fixedly mounted ticket detection device according to the application is fixedly, i.e. in particular permanently, attached to a support or is fixedly, i.e. permanently, integrated in an apparatus. In particular, a fixedly mounted ticket detection device according to the application is not a portable device, such as a mobile terminal or the like.

A fixedly mounted ticket detection device according to the application with a camera-based detection equipment for optical respectively graphical ticket codes cannot be moved and/or aligned by a user in the intended use, i.e. in particular in a mounted state of the ticket detection device. An optical respectively graphical ticket code to be read by the permanently mounted ticket detection device can be held by a user for the purpose of reading (only) in the detection area of the camera-based detection equipment and aligned there by moving the ticket medium to the camera-based detection equipment.

In this respect, the fixedly mounted ticket detection device according to the application differs in particular from a hand-held reading device, for example, from a mobile terminal, such as a smartphone with a camera. Such a mobile, non-fixedly mounted device is held movably in the hand by a user for the purpose of reading. The user points the non-fixed device at the graphical ticket code to be read so that the camera-based detection equipment, in particular, a camera, of the non-fixed device optically detects the ticket code. The actual reading respectively scanning, i.e., the determining of the data content of the detected optical ticket code from the detected respectively recorded image data, can thereby take place in a software application installed on the mobile terminal.

A fixedly mounted ticket detection device according to the application can be operated in a stationary manner in an access control system, for example, at access control areas, such as an inlet (e.g., entrance or entry lane) and/or outlet (e.g., exit or exit lane), for public transportation (PT) systems, parking garages, parking lots, or buildings.

In addition, a fixedly mounted ticket detection device according to the application can be operated in a mobile manner, in particular, in public transport vehicles, such as buses, streetcars, subways, trains, ferries, and boats. In this case, a ticket detection device may be permanently mounted on a support of a vehicle.

Fixedly mounted ticket detection devices may be used, in particular, in so-called stationary validators (also called "ticket validators"), passage barriers or passage blockers (also called "gates"), entry and driveout control devices of parking garages and parking lots, door readers for building access, vehicle-mounted validators, and/or so-called fareboxes used, in particular, in buses.

As has already been described, a ticket detection device according to the application comprises at least one camera-based detection equipment and an evaluation equipment coupled to the camera-based detection equipment. In particular, image data of images detected respectively recorded by the camera-based detection equipment can be provided to the evaluation equipment via a communication connection for further processing.

A camera-based detection equipment can be, in particular, a CCD (charge-coupled device)-based camera system, but also another camera system.

The graphical ticket code, also called optical ticket code, is, in particular, a 1D bar code (also called bar code) or 2D bar code (also called stack code), in particular, in the form of a QR code. However, the graphical ticket code can also be another graphic code, such as a 3D barcode or 4D barcode.

A ticket code according to the application contains data content. In particular, the data content may comprise at least an access authorization respectively usage authorization for a particular service, such as a parking service or a passenger transportation service. Thus, the access authorization, in particular, entitles a user to entering/driving-in into a controlled area and/or to exiting/driving-out from a controlled area. The access authorization is, in particular, formed by an authentication datum, such as a ticket information and/or a user identifier (e.g. a user name, a terminal identifier, such as the IMEI, etc.). Accordingly, an access authorization indicates, in particular, that a user is authorized to pass through the inlet and/or outlet or to use a particular service.

The data content of the ticket code can also contain an identification of a user on the basis of which the access control system verifies whether a valid access authorization or usage authorization is stored in the access control system for the identification or can be purchased by a stored payment means (so-called ID-based ticketing or access control system). However, this has no influence on the object according to the application. Without limiting generality, it is assumed below that the graphical ticket code contains the access authorization respectively usage authorization of a user.

The ticket medium is preferably a mobile terminal with a display respectively a screen. The ticket code can be displayed on the display. This can be controlled by an application installed on the mobile terminal. Exemplary and non-exhaustive mobile terminals are smartphones, tablet computers, mobile game consoles, laptops, netbooks, smart watches and similar wearables. Alternatively, a mobile device may be a dedicated ticketing device designed exclusively for an access application. However, the ticketing medium is not limited to a mobile terminal, but can also be another ticketing medium, such as a paper-based or card-based ticketing medium, for example, with a graphical ticket code located, in particular, printed on an outer surface.

The evaluation equipment of the ticket detection device is at least configured to extract the data content of a ticket code from the provided image data. In particular, the evaluation equipment comprises an evaluation logic for extracting the data content from the ticket code contained in the provided image data. The evaluation equipment may be integrated in the camera-based detection equipment or implemented separately therefrom.

According to the application, the ticket detection device comprises at least one optical display equipment, in particular, a display or a screen. The display equipment is communicatively coupled to at least the camera-based detection equipment. Via the communication connection, the detected image data (which is also provided to the evaluation equipment) can be provided to the display equipment.

The display equipment is configured to display the provided image data as images. In this case, the optical display equipment is arranged in such a way that it is located in the field of view of a user who holds a ticket medium in the detection area of the camera-based detection equipment.

By enabling the user to see the image data (currently) detected by the camera-based detection equipment as images on the display equipment, a presentation error during the scanning process is immediately apparent to the user. This enables the user to make an (immediate) correction of the presentation of the ticket code in a targeted manner.

In one embodiment, the camera-based detection equipment may be a lay-on scanner. When placing the ticket medium on a lay-on scanner, a user cannot recognize by looking at his ticket medium which images are actually detected by the lay-on scanner. For example, the display of a mobile terminal may change while the mobile terminal is turned over and placed on the scanner (for example, due to an activated position sensor that automatically causes the screen content to rotate, an operating error, an automatic switch to a sleep mode, etc.). According to the application, such a change is immediately apparent to the user by the pictorial reproduction on the display equipment of the image data detected by the lay-on scanner so that the user can take specific measures to eliminate the presentation error.

According to the application, the presentation of the image data as images on the display equipment significantly improves the reading process of a ticket code. In particular, by presenting the image data as images, the user is assisted by a guided human-machine interaction in performing a technical object.

Thus, the cognitive content of the information presented to the user concerns an internal state (can the data content of a ticket medium be extracted or not) prevailing in the technical system, i.e., in particular, the ticket detection device according to the application, and enables the user to operate the technical system correctly, i.e., in particular, to present the ticket code in such a way that the data content can be extracted (without errors). The presentation of the image data as images and thus the presentation of an internal state of the ticket detection device (in particular, of the evaluation equipment in connection with the camera-based detection equipment) cause the user to interact with the ticket detection device, in particular, in order to avoid a technical malfunction (the non-reading or non-extraction of the data content).

According to a preferred embodiment of the ticket detection device according to the application, the optical display equipment can be configured to display the image data instantaneously detected by the camera-based detection equipment as images, in particular, in an unchanged form (in particular, the screen content of the display equipment can mirror 1:1 what is held in front of the camera-based detection equipment (also called barcode scanner)).

In particular, a reproduction of the instantaneously detected image data as images occurs in real time (as far as this is technically possible). This means, in particular, that an electronic mirroring of the images detected by the code reader respectively the camera-based detection equipment is carried out by the display equipment. In particular, the detected overall image can be displayed. The current images respectively the current image data of the camera unit of the barcode scanner respectively of the detection equipment cannot only be provided to the evaluation equipment for determining the data content, but can also be displayed in parallel in real time on the display equipment of the ticket detection device as images visible to the user.

This allows the user to easily check whether and how well the ticket code is currently being detected by the barcode reader. A reaction to a possibly existing presentation error is thereby purposefully possible.

In addition to the faster, successful reading process, there can also be a learning effect in the handling by the user (e.g. switch off the position sensor of the ticket medium beforehand, increase the brightness of the display of the ticket medium, hold the ticket medium in the correct position at the correct angle relative to the permanently mounted ticket detection device, etc.). This can further speed up future reading operations on identical or at least similarly formed fixedly mounted ticket detection devices.

According to a further embodiment of the ticket detection device according to the application, the ticket detection device may comprise at least one error evaluation module communicatively coupled to the camera-based detection equipment. The detected image data may be provided to the error evaluation module via the communication connection. The error evaluation module may, for example, be integrated in the evaluation equipment or may be a stand-alone module.

The error evaluation module may be configured to determine a presentation error, in particular, a specific presentation error respectively presentation error type, based on the detected image data of the ticket medium and at least one error criterion. In particular, it has been recognized according to the application that different presentation errors may be present. Exemplary and non-exhaustive presentation errors are an incompleteness error respectively an incomplete display of the graphical ticket code (this comprises, in particular, the case that no ticket code is displayed at all), extraneous light errors (for example, there may be disturbing reflections due to extraneous light on the ticket medium), brightness errors (e.g., the brightness respectively brightness level set for the display of the ticket medium may prevent a successful extraction of the data content), contrast errors (e.g. the contrast respectively contrast level set for the display of the ticket medium may prevent successful extraction of the data content), sharpness errors (e.g. the detected images may be too blurry).

In particular, in order to determine whether a specific presentation error out of a plurality of (aforementioned) presentation errors is present, an associated error criterion may be predefined for each presentation error. The error criterion may indicate when a specific presentation error is (or is not) present.

According to an embodiment of the ticket detection device according to the application, the at least one error criterion may be selected (in particular, according to the aforementioned error types) from the group comprising:
ticket code completeness criterion,
size criterion,
extraneous light criterion,
brightness criterion,
contrast criterion,
tilt criterion, and
sharpness criterion.

Preferably, a respective error criterion can be predefined for at least two different presentation errors respectively presentation error types. In particular, the error criterion can specify at least one screen content for which a corresponding presentation error is present.

For determining a presentation error, in particular, a comparison of the detected image data with the at least one error criterion can be performed. If the at least one error criterion is met, then, in particular, it may be determined that a corresponding presentation error is present.

Preferably, the determining of the presentation error can be performed continuously, in particular, until it is detected that there is no longer a presentation error. This means, in particular, that during the reading process said comparison can be performed continuously or cyclically, at least until the error criterion is no longer met.

According to a preferred embodiment of the ticket detection device according to the application, the ticket detection device may comprise at least one error output module communicatively coupled to the error evaluation module. In particular, a determined presentation error may be provided to the error output module via the communication connection. The error output module may be integrated in the error evaluation module.

The error output module may be configured at least to cause an error message to be output by the ticket detection device when a presentation error is determined. When a determining of a presentation error occurs continuously or cyclically, the error output module may cause an output of the error message continuously or cyclically during the presence of the presentation error. An outputting of the error message serves, in particular, to inform the user about the determined presentation error (as long as it is present respectively detected). This can further accelerate the reading process.

Alternatively or additionally, the ticket detection device may comprise at least one read confirmation module communicatively coupled to the evaluation equipment. Via the communication connection, the read confirmation module can be informed about a successful extraction of the data content.

In one embodiment, the read confirmation module may be integrated in the evaluation equipment and may be configured, for example, to detect a (successful or error-free) extraction of the data content. Alternatively or additionally, if the data content is (successfully) extracted, it may be concluded that there is no presentation error.

The read confirmation module can be configured at least to cause an outputting of a read confirmation message by the ticket detection device if a successful extraction of the data content of the graphical ticket code from the image data has taken place, i.e. in particular if it has been detected.

According to a further embodiment of the ticket detection device according to the application, the ticket detection device may be configured to output a visual signal, an acoustic signal and/or a haptic signal (e.g. vibration signal) based on a received error message and/or read confirmation message. Preferably, the error output module and/or the read confirmation module may be coupled to the display equipment and may, in particular, be configured to drive the display equipment, preferably with the error message and/or the read confirmation message respectively based on such a message.

For example, the display equipment or an optional further display equipment of the ticket detection device may output an optical signal based on the error message and/or a read confirmation message. For example, depending on the received message, the display equipment may change the background color to inform the user of the presence of a (specific) presentation error and/or of a successful read of the data content.

Also, the ticket detection device may optionally comprise a loudspeaker module configured to output an acoustic signal. For example, the loudspeaker module may output different acoustic signals depending on the received message to inform the user about the presence of a (specific) presentation error and/or about a successful reading of the data content.

Furthermore, a vibration module may optionally be arranged in the ticket detection device. Preferably, the camera-based detection equipment, in particular, in the form of a lay-on scanner, may comprise a vibration function as a vibration module and/or a vibration module may be arranged immediately adjacent to the detection equipment.

In particular, the vibration module may be configured to vibrate a support surface of a lay-on scanner. For example, the vibration module may output different haptic signals respectively vibration signals depending on the received message, in particular, to the support surface, to inform the user about the presence of a (specific) presentation error and/or about a successful reading of the data content. Via the support surface, the vibration signal can be transmitted, in particular, to the ticket medium and a hand of the user. In a simple manner, the user experiences feedback on the progress of the reading process.

According to a preferred embodiment of the ticket detection device, at least one first (optical, acoustic and/or haptic) signal can be output at least almost continuously or cyclically by the ticket detection device during the presence of a presentation error, and in particular at least one second (optical, acoustic and/or haptic) signal can be output by the ticket detection device upon detection of an error-free presentation of the graphical ticket code respectively upon detection of a read confirmation. The at least one second signal may be different from the first signal.

Furthermore, according to a further preferred embodiment of the ticket detection device according to the application, the optical display equipment may be configured to imitate a determined presentation error based on a received error message. In particular, imitating a determined presentation error may comprise changing the brightness of the optical display equipment based on a brightness error determined to be a presentation error. In other words, the screen content of the display equipment may imitate respectively adapt at least one property corresponding to a property of the instantaneously detected image of the ticket medium. For example, if the screen of a mobile terminal held in front of the user is too dark, i.e., there is a brightness error, the displaying screen, i.e., the display equipment, may also be set with a corresponding brightness level.

As has already been described, the user can preferably be informed of a determined presentation error. According to a further embodiment of the ticket detection device according to the application, the optical display equipment may be configured to output a text specifying the determined presentation error (e.g., "There is no barcode on your phone," "The contrast is not sufficient," "The screen is too dark," etc.) based on an error message received.

Optionally, visual icons can also be output and/or a voice message with text specifying the determined presentation error can be output through a loudspeaker module. The user can even more quickly correct a presentation error.

According to a further embodiment of the ticket detection device, the ticket detection device may comprise at least one instruction module communicatively coupled to the error evaluation module. In particular, the determined presentation error may be provided to the instruction module via the communication connection. The instruction module may be integrated in the evaluation equipment.

The instruction module may be configured to determine at least one outputable user instruction for error recovery based at least on the determined presentation error and a plurality of user instructions stored for the at least one presentation error. The instruction module may be configured to cause an outputting of the determined instruction, for example in the form of an instruction text (e.g., "Hold the ticket medium closer to the camera", "Hold the ticket medium further away from the camera", "Tilt the ticket medium in a specific direction", "Increase the brightness", "Reduce the brightness", etc.). In particular, based on historical data, an appropriate instruction for a determined presentation error may be determined, or it may be based on pre-performed tests and/or empirical data. The outputting may, in particular, be performed by the display equipment. Alternatively or additionally, an outputting may also be performed by a loudspeaker module, a further display equipment and/or the like.

As has already been described, the error evaluation module may preferably be configured to determine the outputable instruction based on the detected image data and historical (image) data, in particular, based on a comparison of said data. Each historical image data may be associated with an instruction that corrects the presentation error that is the basis of the historical image data.

According to a preferred embodiment of the ticket detection device according to the application, the ticket detection device may comprise at least one near field communication interface communicatively coupled to the error output module. The near-field communication interface may be configured to send an error message to the ticketing medium in the form of a mobile terminal. In particular, the mobile terminal may have a near field communication interface corresponding to respectively compatible with the near field communication interface of the ticket detection device. Preferably, an NFC interface may be provided in each case.

The error message may comprise first instructions that, when executed by a processor of the mobile terminal, cause the mobile terminal to output at least a first indication signal, in particular, a first vibration signal. In other words, the mobile terminal may be caused to output a first vibration signal indicating, in particular, the presence of a presentation error.

Preferably in addition, according to a further embodiment of the ticketing device, the ticketing device may comprise at least one near field communication interface communicatively coupled to the error output module configured to send a read confirmation message to the ticketing medium in the form of a mobile terminal. In particular, the mobile terminal may have a near field communication interface corresponding to respectively compatible with the near field communication interface of the ticketing device. Preferably, an NFC interface may be provided in each case.

The read confirmation message may include second instructions that, when executed by a processor of the mobile terminal, cause the mobile terminal to output at least a second indication signal, in particular, a second vibration signal. In particular, the first indication signal may be different from the second indication signal. In other words, the mobile terminal may be caused to output a second vibration signal indicating, in particular, the presence of a successful reading of the data content.

It shall be understood that another near-field technology may be used and/or at least one other indication signal may be output, such as an acoustic indication signal and/or a visual indication signal (in particular, in the case of a ticketing medium having two (facing) displays).

For example, the ticket detection device may send a first data signal via near-field communication (e.g., NFC) by the near-field communication interface in the event of incorrect attempts to read the ticket code. The mobile terminal may receive the first data signal. The first data signal may contain first instructions. An access application installed on the mobile terminal may evaluate the received first data signal, in particular, the first instructions, and may preferably trigger the first vibration signal. In addition, for example, the ticket detection device may transmit a second data signal via near field communication (e.g., NFC) by the near field communication interface upon a successful reading of the ticket code. The mobile terminal may receive the second data signal. The second data signal may contain second instructions. The access application installed on the mobile terminal may evaluate the received second data signal, in particular, the second instructions, and may preferably trigger the second vibration signal. The reading process can be even further accelerated.

According to a further preferred embodiment of the ticket detection device according to the application, the ticket detection device may comprise at least one ticket medium detection module coupled to the camera-based detection equipment. Detected image data may be provided to the ticket medium detection module via the communication connection. For example, the ticket medium detection module may be integrated in the evaluation equipment.

The ticket medium detection module may be configured to detect a presence of a ticket medium in the detection area of the camera-based detection equipment, that is, in particular, a ticket medium held at least partially in the detection area. Preferably, the ticket medium detection module may be configured to detect a change from a non-presence of a ticket medium to a presence of a ticket medium and/or a change from a presence of a ticket medium to a non-presence of a ticket medium.

The ticket medium detection module may be configured to cause a displaying of the image data detected by the camera-based detection equipment as images only upon detection of the presence of the ticket medium in the detection area of the camera-based detection equipment.

During the absence of a ticket medium in the detection area, the display equipment may, for example, be set to an idle mode. Preferably, a specific period of time (e.g., 1 min, 5 min, etc.) may be predefined. If the ticket medium detection module determines that a non-presence of a ticket medium in the detection area continues to be detected after this period of time has elapsed, a switching of the operating mode of the display equipment to an idle mode can be caused. This can save energy. It shall be understood that during the detection of a non-presence of a ticket medium, the display equipment may also display other information.

In particular, at least one switching criterion may be predefined. Preferably, the at least one switching criterion may define a presence of a change from a non-presence of a ticket medium to a presence of a ticket medium and/or a change from a presence of a ticket medium to a non-presence of a ticket medium.

The ticket medium detection module may be configured to evaluate the detected image data together with the at least one switching criterion. In particular, the ticket medium detection module may determine whether the (instantaneously) detected image data satisfies the at least one switching criterion. If this is the case, the ticket medium detection module can cause a switchover, i.e., in particular, cause a displaying of the image data detected by the camera-based detection equipment as images (upon detection of a change from a non-presence of a ticket medium to a presence of a ticket medium) or cause a displaying of other information (upon detection of a change from a presence of a ticket medium to a non-presence of a ticket medium) and/or cause a setting of the ticket medium detection module to an idle mode (upon detection of an expiration of said period of time). The at least one switching criterion may, for example, define a scope of an image change as seen by the camera-based detection equipment.

According to a further embodiment of the ticket detection device according to the application, the ticket detection device may comprise at least one release equipment configured to generate a release signal based on an evaluated data content of the graphical ticket code. Preferably, in this embodiment, the ticket detection device according to the application may be integrated in a gate.

As has already been described, the data content (in particular, a pre-described access authorization) can be evaluated. If the evaluation results in an authorization of the user to pass the gate, the release signal can be generated. In particular, an actuator of the gate can be driven with the release signal to adjust a blocking element so that the user can pass the gate. If the evaluation determines that the user is not authorized to pass through the gate, the gate may remain blocked.

A further aspect of the present application is a method of operating a fixedly mounted ticket detection device, in particular, a previously described ticket detection device. The method comprises:
  detecting, by at least one camera-based detection equipment, images of a graphical ticket code of a ticket medium in the detection area of the camera-based detection equipment,
  generating, by the at least one camera-based detection equipment, detected image data from the detected images,
  extracting, by at least one evaluation equipment communicatively coupled to the camera-based detection equipment, the graphical ticket code of the detected image data, and
  displaying, by at least one optical display equipment communicatively coupled to the camera-based detection equipment, the image data detected by the camera-based detection equipment as images.

A still further aspect of the application is an access control system for a passenger transportation system or a parking system, comprising:
  at least one ticket detection device communicatively coupled to at least one gate (in particular, a passage barrier or drive through barrier) and described above,
  wherein the access control system comprises at least one release equipment communicatively coupled to an evaluation equipment (of the ticket detection device or of a backend system of the access control system) and configured to generate a release signal based on an evaluated data content of an extracted graphical ticket code, and the gate is configured to enable a passing (in particular, going through or driving through) through the gate based on a received release signal.

In particular, the gate may have a blocking element. To enable a passing of the gate, an actuator of the blocking element can be driven with the release signal. This can, in particular, cause a moving of the blocking element.

Alternatively or in addition to the blocking element, the gate may have a visual indicator which is controlled by the release equipment and prohibits or allows the user to pass by means of a visual signal (e.g., a traffic light).

The access control system comprises at least one evaluation equipment. Here, the at least one evaluation equipment can be the (local) evaluation equipment of the previously described ticket detection device or a further evaluation equipment of a backend system of the access control system. The evaluation equipment can be configured to verify the data content, in particular, an access authorization respectively access code. In particular, the access authorization can be verified in a conventionally manner.

In an access control system, which may in particular be a component of a passenger transport system or parking system, it may be necessary for the user to register with this system prior to the first use of a ticket detection device according to the application (for example, in order to use a transport service or parking service).

Upon a successful registration, a user account for the registered user is created in the access control system, in particular, the backend system of the access control system (also called background system) by storing identification data in the backend system, such as a unique (user) identifier (ID) of the user, authentication data, e.g. a password, and billing data, e.g. credit card data or account details, address data or other data for billing. Collectively, this data is called user master data. In addition, an access application in the form of a so-called app may be installed on the mobile device of the registered user. For example, the access authorization may be formed by at least one of the previously mentioned data (e.g., unique (user) identifier) and/or ticket information).

Furthermore, in one embodiment, the access control system may comprise at least one previously described ticketing medium.

A previously described module, element, equipment, etc., may comprise at least in part hardware elements (e.g., processor, memory means, etc.) and/or at least in part software elements (e.g., executable code). It shall further be noted that terms such as "first"; "second", "further", etc. do not indicate an order, but are used, in particular, to distinguish between two elements (e.g. gate, area, etc.).

The features of the ticket detection devices, methods and access control system can be freely combined with each other. In particular, features of the description and/or dependent claims may be independently inventive, even by completely or partially bypassing features of the independent claims, either alone or freely combined with each other.

BRIEF DESCRIPTION OF THE DRAWINGS

There are now a multitude of possibilities for designing and further developing the fixedly mounted ticket detection device according to the application, the access control system according to the application and the method according to the application. In this regard, reference is made on the one hand to the claims subordinate to the independent patent claims, and on the other hand to the description of embodiments in connection with the drawings The drawings show:

In the following, similar reference signs are used for similar elements.

DETAILED DESCRIPTION OF SPECIFIC EMBODIMENTS

Figure 1:
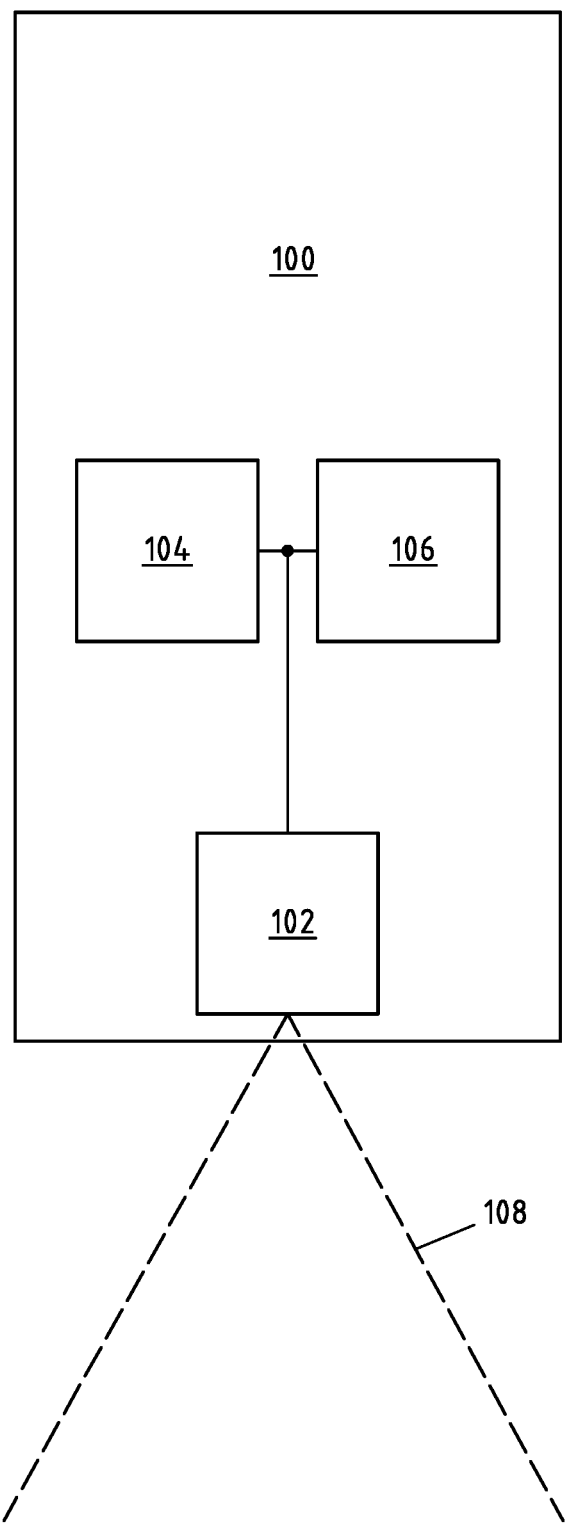
FIG. 1 a schematic view of an embodiment of a fixedly mounted ticket detection device according to the present application, FIG. 2 a schematic view of a further embodiment of a fixedly mounted ticket detection device according to the present application, FIG. 3a-f schematic views of exemplary typical images that can be detected by the camera-based detection equipment of a fixedly mounted ticket detection device according to the present application from tickets held in front of it, FIG. 4 a schematic view of a further embodiment of a fixedly mounted ticket detection device according to the present application, FIG. 5 a schematic view of an embodiment of an access control system according to the present application, FIG. 6 a schematic view of a further embodiment of an access control system according to the present application, and FIG. 7 a diagram of an embodiment of a method according to the present application.

FIG. 1 shows a schematic view of an embodiment of a fixedly mounted ticket detection device 100 according to the present application. In an intended use, i.e. when ticket codes are to be detected, the shown ticket detection device 100 is fixedly attached to a support or is fixedly mounted or integrated in a further apparatus (e.g. a gate or a part of a gate). The further apparatus, in turn, is in particular fixedly mounted to a support (e.g., a floor).

The illustrated ticket detection device 100 comprises a camera-based detection equipment 102 (e.g., a CCD-based camera system, CMOS chip (also called active pixel sensor) based camera system, or the like), an evaluation equipment 104, and an optical display equipment 106, in particular, a display screen 106. As can be seen from FIG. 1, in the present embodiment, the detection equipment 102, the evaluation equipment 104, and the display equipment 106 are communicatively coupled to each other. In particular, this means that said equipments can exchange data with each other.

Furthermore, a detection area of the camera-based detection equipment 102 is schematically shown and marked with the reference sign 108.

The camera-based detection equipment 102 is configured to detect respectively record images of a graphical respectively optical ticket code of a ticket medium (not shown in the present embodiment), which is located in the detection area 108 of the camera-based detection equipment 102. In particular, a user may hold the ticket medium with the graphical ticket code in the detection area 108, in particular, during a scanning process.

Detected image data can be generated from the detected images and provided to the evaluation equipment 104 and the display equipment 106, in particular, in real time.

The evaluation equipment 104 is configured at least to obtain the detected image data from the camera-based detection equipment and to extract a data content of the graphical ticket code from the obtained detected image data. In other words, the evaluation equipment 104 is configured to read the data content of the ticket code. As has been described, the ticket code may be, in particular, a 1D barcode or 2D barcode and may contain, as data content, at least one access authorization.

The optical display equipment 106 is configured to display the image data detected and, in particular, provided by the camera-based detection equipment 102 as images. In particular, a reproduction of the instantaneously detected images is performed dynamically respectively in real time (as far as this is technically possible). The images instantaneously detected by the camera-based detection equipment 102 are, in particular, electronically mirrored by the display equipment 106 and, in particular, thus visualized to the user of the ticket medium.

By displaying the instantaneously detected images, the user can promptly detect a presentation error and take targeted corrective action so that reading respectively extracting of the data content by the evaluation equipment 104 can occur (promptly and, in particular, without errors).

Figure 2:
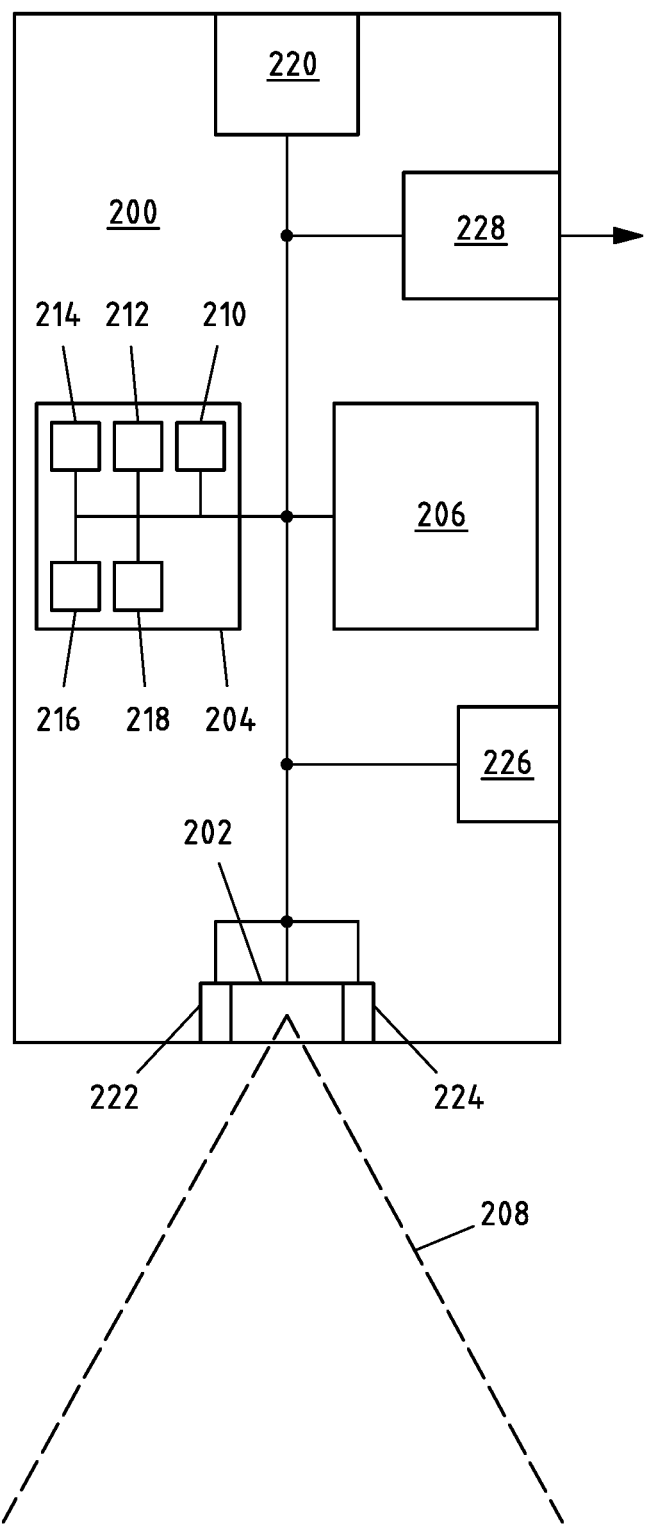

FIG. 2 shows a schematic view of a further embodiment of a fixedly mounted ticket detection device 200 according to the present application. In order to avoid repetition, essentially only the differences from the previous embodiment are described below and otherwise reference is made to the previous embodiments.

As can be seen from FIG. 2, the evaluation equipment 204 in the present application has a plurality of optional modules 210 to 218. It shall be understood that in variants of the application, these modules may also be implemented separately from the evaluation equipment.

In particular, the ticket detection device 200 comprises an error evaluation module 210 communicatively coupled to the camera-based detection equipment 202. The error evaluation module 210 is, in particular, configured to determine a presentation error based on the detected image data of the ticket medium and at least one (predefined) error criterion. The error criterion may, in particular, represent a screen content in which a presentation error is present. For example, by comparing the detected image data with reference image data representative of the at least one error criterion a presentation error may be determined by the error evaluation module 210.

Upon a determination of a (specific) presentation error, this information may be provided to the error output module 212. In variants of the application, the error evaluation module and the error output module may be formed by a common module.

In particular, the error output module 212 is configured at least to cause an outputting of an error message by the ticket detection device 200 when a presentation error is determined. Preferably, when a determining of a presentation error by the error evaluation module 210 occurs continuously, the error output module 212 may cause an outputting of the error message continuously or cyclically during the time period of the presence of the presentation error.

Preferably, the error output module 212 may be configured to drive the display equipment 206 such that a visual signal is output as the error message. For example, the background of the at least one display equipment 206 may change from a first color (e.g., white) to a further color (e.g., red), a specific text (e.g., "reading ticket not possible") may be output, or a symbol may be displayed to indicate to the user that reading the ticket is not possible.

Alternatively or additionally, an optional loudspeaker module 226 may be driven by the error output module 212 such that an acoustic signal (e.g., a specific first tone or sequence of tones, a voice message (e.g., "ticket code cannot be read"), or the like) is output as an error message.

Furthermore, alternatively or additionally, the error output module 212 may drive an optional vibration module 222 such that a haptic signal (e.g., a particular first vibration signal) is output as an error message. In particular, a vibration module 222 may be arranged immediately adjacent to or integrated with the camera-based detection equipment 202. In particular, in the case of a detection equipment 202 in the form of a support scanner 202 this can cause that a generated vibration is transmitted from a support surface of the lay-on scanner to the ticket medium and thus be perceptible by the user.

As has been described above, preferably the display equipment 206 may be configured to imitate respectively mimic a determined presentation error. For example, if the brightness level set on the screen respectively display of the ticket medium is too bright (or too dark), the display equipment 206 may mimic respectively imitate that brightness level. In particular, an adjustment of the brightness level may be caused in accordance with the determined presentation error, for example, prompted by the error output module 212. In the given example, the brightness level may be set to be correspondingly bright (or dark). A presentation error is easily detectable by the user.

Preferably, a read confirmation module 214 may be provided. The read confirmation module 214 may be configured to detect a successful respectively error-free extracting of the data content. The read confirmation module 214 may, upon a corresponding detection, i.e., when a successful extraction of the data content of the graphical ticket code from the detected image data has occurred, be configured to cause an outputting of a read confirmation message by the ticket detection device 200.

Alternatively or additionally, in variants of the application, the read confirmation module 214 may conclude that a data content has been extracted from a non-presence of a presentation error.

Preferably, the read confirmation module 214 may be configured to drive the display equipment 206 such that a visual signal is output as the read confirmation message. For example, the background of the display equipment 206 may change from a first color to a further color (for example, the background may then be green, for example, change from red to green), a specific text (e.g., "Reading of the ticket was successful") may be output, or an icon may be displayed to indicate to the user that a reading of the ticket was successful.

Alternatively or additionally, the read confirmation module 214 may drive the loudspeaker module 226 such that an acoustic signal (e.g., a specific further tone different from the first tone, or a specific further sequence of tones different from the first sequence of tones), a voice message (e.g., "ticket code was successfully read"), or the like is output as a read confirmation message.

Furthermore, alternatively or additionally, the read confirmation module 214 may drive a vibration module 222 such that a haptic signal (e.g., a specific further vibration signal that is different from the first vibration signal) is output as the read confirmation message.

Furthermore, an instruction module 216 may optionally be provided. In particular, the instruction module 216 is configured to determine at least one outputable user instruction for error recovery based on at least the determined presentation error and a plurality of user instructions stored for the at least one presentation error, for example, stored in a (not shown) data memory of the ticket detection device

200. The instruction module 216 may be configured to cause an outputting of the determined instruction. For this purpose, the instruction module 216 may, for example, drive the display equipment 206 and/or the loudspeaker module 226.

Advantageously, the display equipment 206 only displays the instantaneous image data detected by the camera-based detection equipment 202 as images if there is actually a ticket medium (or similar object) in the detection area 208. Otherwise, the display equipment may display other content/information or be in an idle/power saving mode.

Preferably, a ticket medium detection module 218 may be provided to detect the presence of a ticket medium in the detection area 208, in particular, to detect a change from a non-presence of a ticket medium to a presence of a ticket medium. The ticket medium detection module 218 may be configured to detect a presence of a ticket medium in the detection area 208 of the camera-based detection equipment 202 based on the provided and at least one switching criterion.

Preferably, the at least one switching criterion may define a provision of a change from a non-presence of a ticket medium in the detection area to a presence of a ticket medium and/or a change from a presence of a ticket medium in the detection area to a non-presence of a ticket medium. The at least one switching criterion may, for example, define a scope of an image change as seen by the camera-based detection equipment which is at least indicative of a previously mentioned change.

The ticket medium detection module 218 may be configured to evaluate the detected image data together with the at least one switching criterion. In particular, the ticket medium detection module 218 may determine whether the (instantaneously) detected image data satisfies the at least one switching criterion. If this is the case, the ticket medium detection module 218 may cause a switchover, that is, in particular, cause the display equipment 206 to display the image data detected by the camera-based detection equipment 202 as images (upon detection of a change from a non-presence of a ticket medium to a presence of a ticket medium), or cause a displaying of other information (upon detection of a change from a presence of a ticket medium to a non-presence of a ticket medium), and/or cause a setting of the ticket medium detection module 218 to an idle mode (upon detection of an expiration of said period of time).

Furthermore, in the present embodiment, the ticket detection device 200 comprises an optional near-field communication interface 224 preferably arranged adjacent to the camera-based detection equipment 202. Preferably, the near-field communication interface 224 may be an NFC-based interface 224. It shall be understood that other wireless transmission technologies may be used in other variants.

In particular, in the case of a detection device 202 in the form of a lay-on scanner 202, by the adjacent arrangement of an NFC-based interface it can be caused an establishing of a (secure) communication link with a ticket medium (e.g., a smartphone) positioned on the lay-on scanner 202. The ticket medium may, in particular, also have an NFC interface for this purpose.

Data can be transmitted to the ticket medium, in particular, via the communication link. The near field communication interface 224 is, in particular, configured to send an error message to the ticket medium in the form of a mobile terminal.

The error message may contain first instructions that, when executed by a processor of the mobile terminal, cause the mobile terminal to output at least a first indication signal, in particular, a first vibration signal. In other words, the mobile terminal may be caused to output a first vibration signal indicating, in particular, the presence of a presentation error. Preferably, this may be controlled by an access application installed on the mobile terminal.

It shall be understood that in other variants of the application, the first indication signal may alternatively or additionally be a visual signal or an acoustic signal.

Preferably, in addition, the near field communication interface 224 may be configured to send a read confirmation message to the ticketing medium in the form of a mobile terminal.

The read confirmation message may contain second instructions that, when executed by a processor of the mobile terminal, cause the mobile terminal to output at least a second indication signal, in particular a second vibration signal. In particular, the second indication signal may be different from the first indication signal. In other words, the mobile terminal may be caused to output a second vibration signal indicating in particular the presence of a successful reading of the data content. Preferably, this may be controlled by an access application installed on the mobile terminal.

It shall be understood that in other variants of the application, the second indication signal may alternatively or additionally be a visual signal or an acoustic signal.

Furthermore, the ticket detection device 200 may comprise at least one remote communication module 220. The remote communication module 220 may be configured to exchange data with a remotely located (not shown) backend system (for example, formed by at least one server or a so-called cloud server). For example, to perform an authentication, an access authorization extracted from a ticket code may be transmitted to the backend system. Furthermore, the result of an authentication verification may be sent by the backend system to the ticket detection device 200. It shall be understood that further data may be exchanged between the backend system and the ticket detection device 200.

The result of the authentication verification may be provided to the release equipment 228. In particular, the release equipment 228 is configured to generate a release signal based on the evaluated data content of the graphical ticket code, for example the provided result of the authentication verification.

Preferably, in this embodiment, the ticket detection device 200 according to the application may be integrated in a gate (not shown). If the evaluation results in an authorization of the user to pass the gate, the release signal may be generated. In particular, an actuator of the gate can be driven with the generated signal to adjust a blocking element so that the user can pass the gate. If the evaluation results in a non-authorization of the user to pass the gate, the gate can remain blocked.

FIGS. 3*a-f* show schematic views of exemplary typical images that may be detected by the camera-based detection equipment 102, 202 of a fixedly mounted ticket detection device and that are reproduced as screen content of a display equipment 306 in accordance with the application. The ticket detection device may be formed, for example, according to FIG. 1 and/or FIG. 2.

Figure 3A:
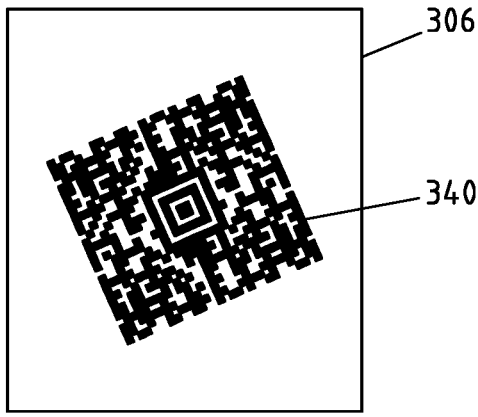

In FIG. 3*a*, the reproduced ticket code 340 or its data content is readable or extractable. The ticket code 340 is, in particular, well aligned to the camera-based detection equipment and has a sufficient quality. Thus, an error-free execution of the reading process is possible.

Figure 3B:
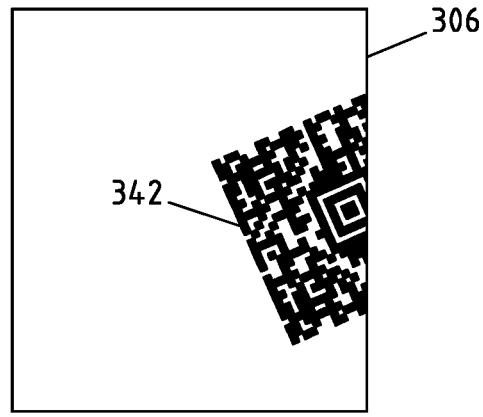

In FIG. 3*b* is shown the case that the ticket code 342 is not completely detected by the camera-based detection equipment, for example, because the ticket medium is only partially held in the detection area of the camera-based detection equipment and/or the ticket code is only partially shown on the display of the ticket medium.

Thus, in particular as a presentation error an incompleteness error is present. As has already been described, such an error can be determined with the aid of at least one predefined error criterion.

By the presented reproduction of the detected image data as images by the display equipment 306, the user can purposefully shift the ticket medium (presently to the left) and/or adjust a displaying of the ticket code on the display of the ticket medium. Subsequently, the data content of the ticket code can be extracted.

Figure 3C:
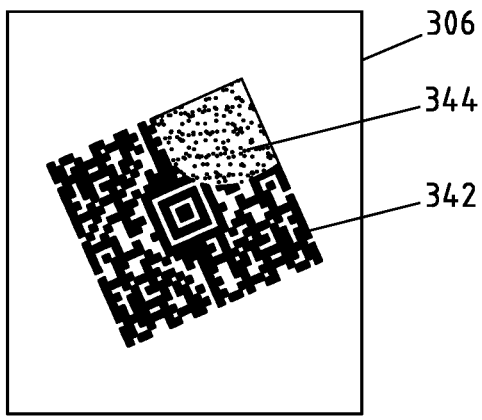

In the example of FIG. 3c, a portion 344 of the ticket code 342 displayed on a display of a ticket medium is struck by extraneous light, for example, by an (unintentional) reflection. This is immediately apparent to the user through the reproduction of the detected image data as images. In particular, an extraneous light error is present as a presentation error.

By the reproduction of the detected image data as images by the display equipment 306, the user can purposefully move the ticket medium, in particular, tilt it in such a way that (almost) no more extraneous light hits the ticket medium respectively the display of the ticket medium. Subsequently, the data content of the ticket medium can be extracted without errors.

Figure 3D:
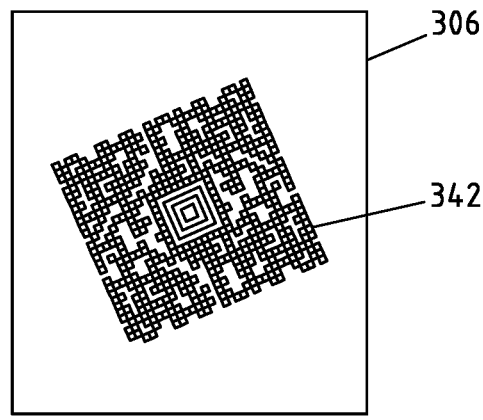

In the example of FIG. 3d a brightness error and/or contrast error is indicated. This means, in particular, that the adjusted brightness level and/or contrast level prevents a reading. Also such a presentation error becomes immediately apparent to the user by the reproduction of the currently detected image data as images.

The user can take targeted countermeasures, in particular, change the contrast level set on the mobile terminal and/or the brightness level. Subsequently, the data content of the ticket code can be extracted without errors.

Figure 3E:
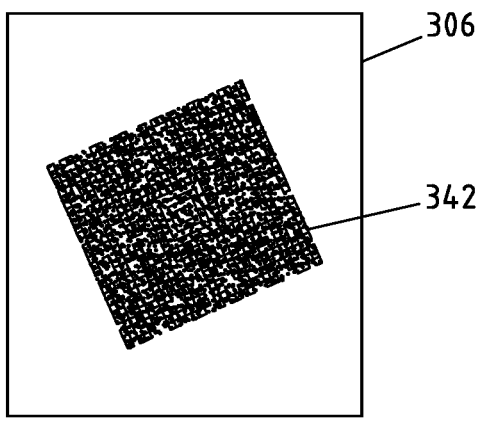

In the example of FIG. 3e, a blur error is indicated. This is also immediately apparent to the user based on the reproduction of the instantaneous image data detected by the camera-based detection equipment as images. The user can move the ticket medium to correct said presentation error, in particular, move it closer to or further away from the detection equipment until a sufficiently sharp representation of the ticket code is present and, in particular, displayed by the display equipment 306. Subsequently, the data content of the ticket code can be extracted without error.

Figure 3F:
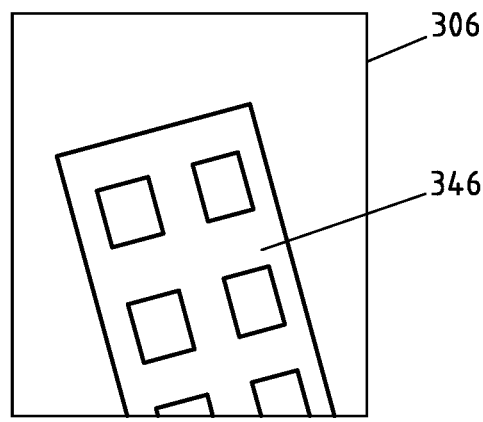

Finally, FIG. 3f shows an example of a further incompleteness error. In this case, the screen of the mobile terminal does not display a ticket code (anymore), for example, due to an accidental app change. Here, too, the presentation error is immediately apparent to the user through the reproduced detected image data as images, so that the user can, in particular, promptly remedy the error, for example, by starting the correct application.

A further possible presentation error not shown in FIG. 3 is the failure to meet a size criterion: the image detected by the camera-based detection equipment may be too large, i.e. the ticket is held too close to the reader, or the detected image may be too small, i.e. the ticket is held too far away from the camera-based detection equipment, and the optical code cannot be resolved.

A further possible presentation error, not shown in FIG. 3, is tilting of the ticket during scanning. As a result of the user holding the ticket tilted in front of the camera-based detection equipment, the optical code is detected in a distorted perspective and the detected image data cannot be evaluated.

Figure 4:
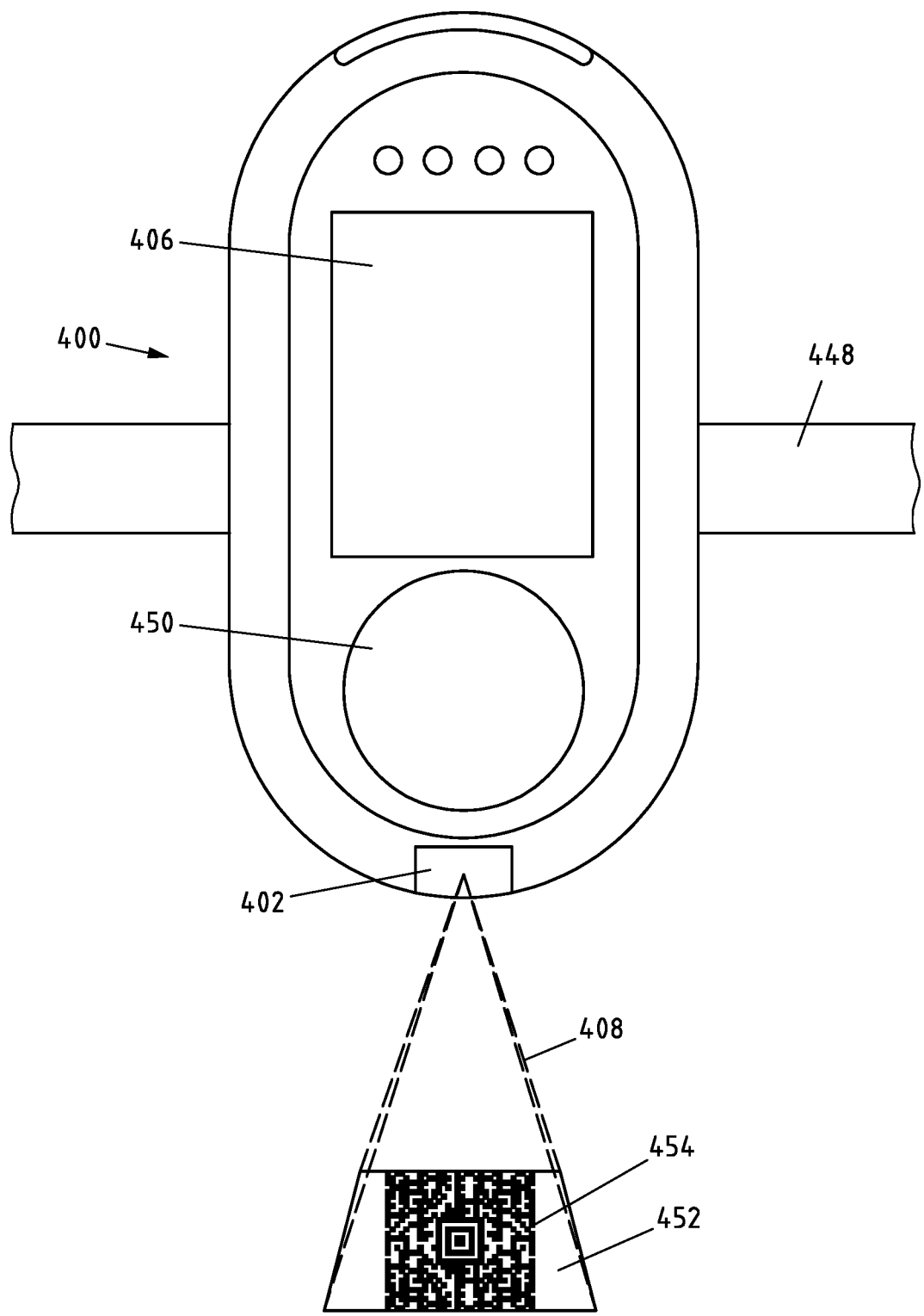

FIG. 4 shows a schematic view of a further embodiment of a fixedly mounted ticket detection device 400 according to the present application. In order to avoid repetitions, essentially only the differences from the previous embodiments are described below and otherwise reference is made to the previous embodiments. In addition, an illustration of an evaluation equipment has been omitted in favor of a better overview. In particular, FIG. 4 illustrates an exemplary external appearance of a ticket detection device 400 according to the application.

As can be seen, an optical display equipment 406 is arranged on an outer side of the housing of the ticket detection device 400. On the underside of the housing (with respect to the mounted state of the ticket detection device 400), the camera-based detection equipment 402 is positioned in the present case.

Exemplarily, a ticket medium 452 with a ticket code 454 is further shown in the detection area 408. Optionally, the ticket detection device 400 may have at least one further communication interface, such as an NFC interface or the like.

In the present embodiment, the ticket detection device 400 is fixedly mounted to a support 448 (e.g., a grab bar of a passenger transport vehicle). Suitable fastening means may be provided on the housing of the ticket detection device 400 for this purpose.

Figure 5:
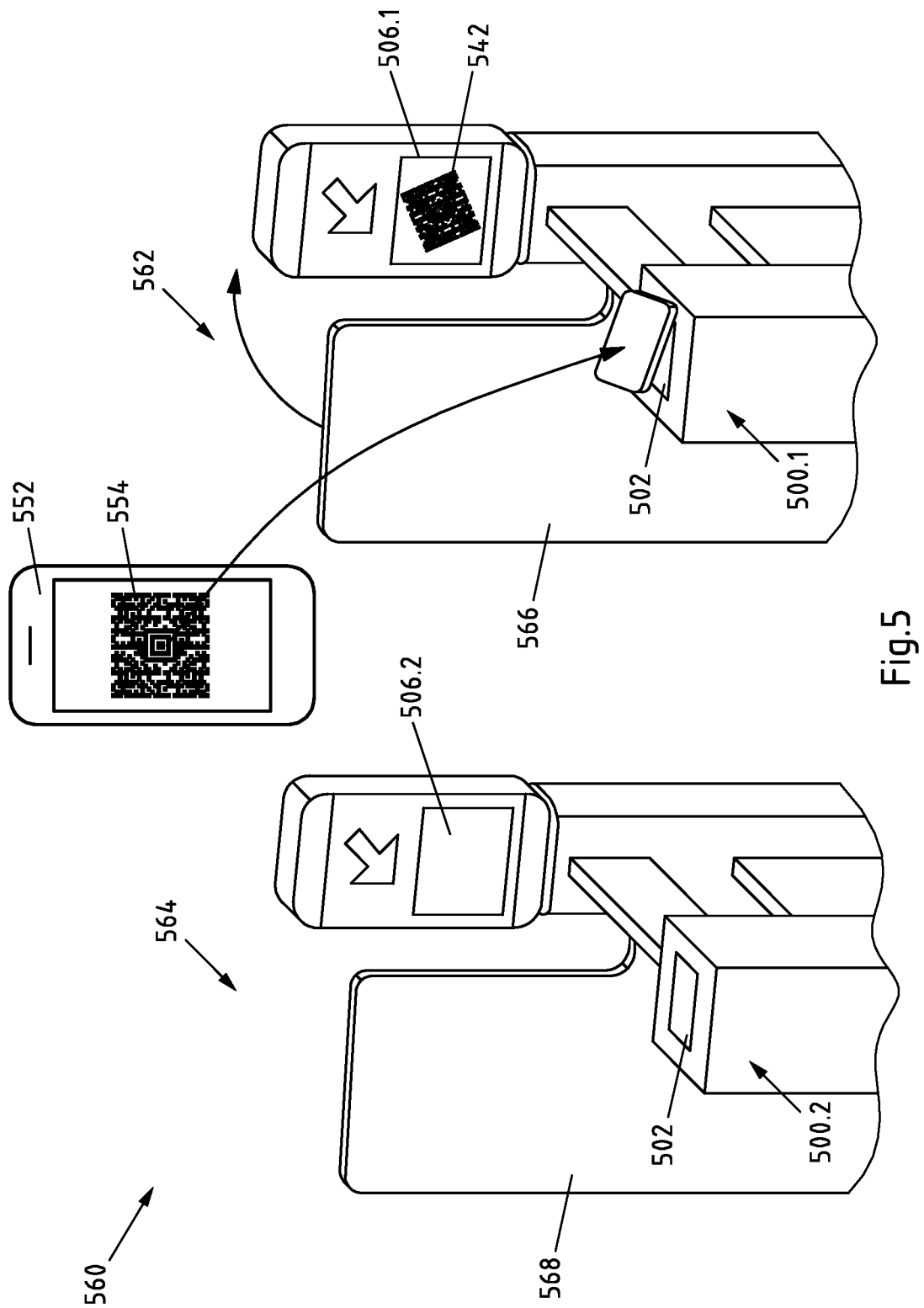

FIG. 5 shows a schematic view of an embodiment of an access control system 560 according to the present application. In order to avoid repetitions, substantially only the differences from the previous embodiments are described below and otherwise reference is made to the previous embodiments. In addition, an illustration of an evaluation equipment has been omitted in favor of a better overview.

The illustrated access control system 560 may be used, in particular, in a passenger transport system. In particular, a gate array having two gates 562, 564 each in the form of a passage barrier 562, 564 is exemplified herein. Each gate 562, 564 may comprise at least one movable barrier element 566, 568. The access control system 560 may comprise the gate array respectively the at least one gate 562, 564.

Preferably, in the present embodiment, in each gate 562, 564 a fixedly mounted ticket detection device 500.1, 500.2 is arranged, in particular, integrated. The gates 562, 564 may in turn be fixedly mounted on a floor.

A ticket detection device 500.1, 500.2 may in particular be formed according to FIG. 1 and/or FIG. 2.

The camera-based detection equipment 502 is, in particular, a lay-on scanner 502. A user may display on his mobile terminal 552 the ticket code 554 to be read. Then, the user may lay the mobile terminal 552 on the lay-on scanner 502.

In the prior art, the user would now not be able to see what the mobile terminal 552 is displaying in the laid-on state. According to the application, the detected image data is displayed or reproduced as images in real time on the display equipment 506. In the present example, the ticket code 542 is displayed without a presentation error.

The access control system 560 comprises at least one evaluation equipment (not shown herein). Here, the at least one evaluation equipment may be the (local) evaluation equipment of the previously described ticket detection device 500.1, 500.2 or another evaluation equipment of a (not shown) backend system.

The evaluation equipment can be configured to verify the data content, in particular, an extracted access authorization respectively access codes. In particular, the access authorization can be verified in a conventional manner by said evaluation equipment.

After a verification of the extracted data content, in particular, the extracted access authorization, a blocking element 566 may be released, in particular, opened. As has been described, for example, a release equipment can control an actuator of the gate 562 with a release signal depending on the check result in order to adjust the blocking element 566 so that the user can pass the gate 562.

If the evaluation determines that the user is not authorized to pass through the gate 562, the gate 562 may remain blocked.

The access control system 560 may optionally comprise the backend system and/or at least one ticket medium 552.

Figure 6:
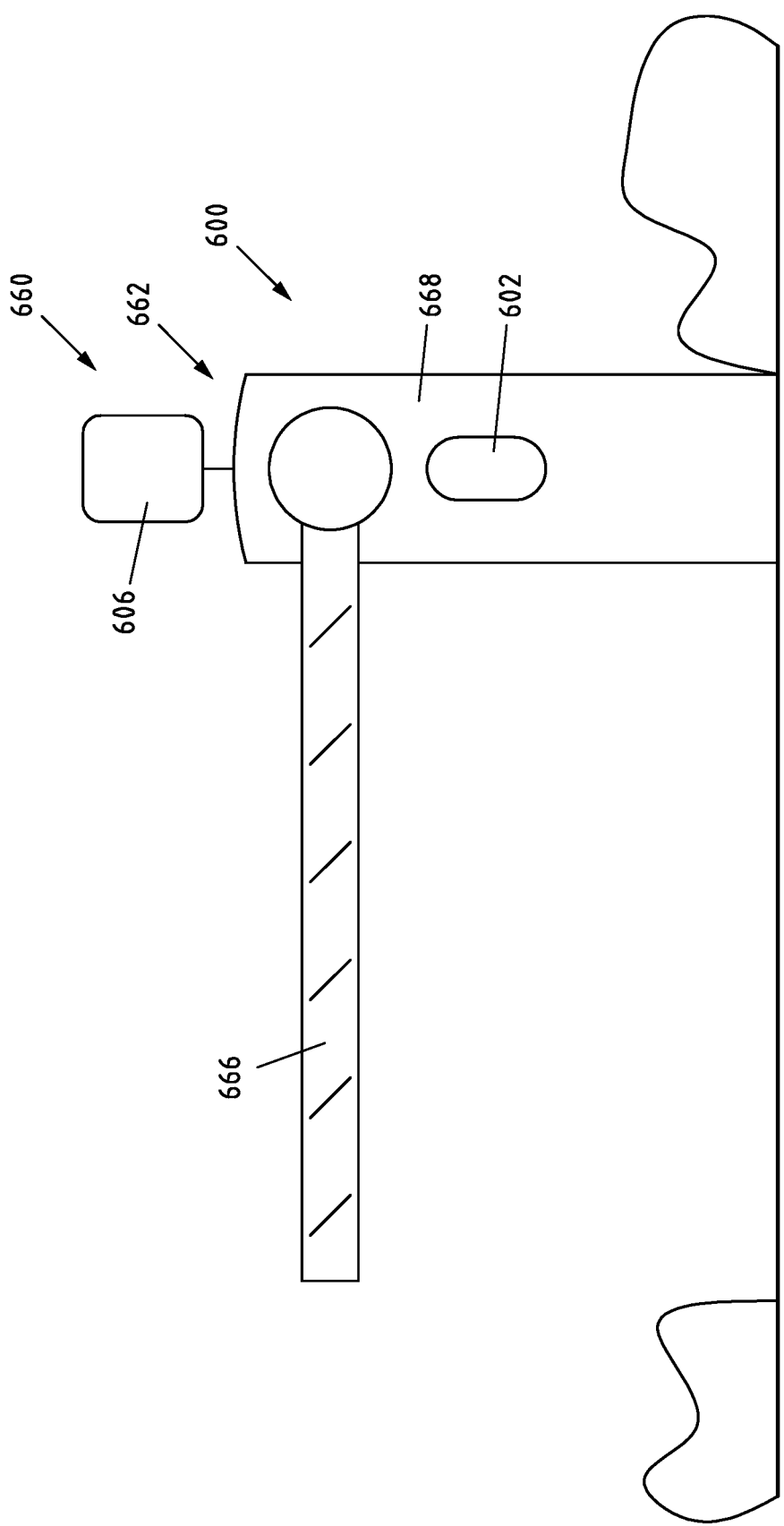

FIG. 6 shows a schematic view of a further embodiment of an access control system 660 according to the present application. In order to avoid repetitions, essentially only the differences from the previous embodiments are described below and otherwise reference is made to the previous embodiments. In addition, an illustration of an evaluation equipment has been omitted in favor of a better overview.

The illustrated access control system 660 may be used, in particular, in a parking system. For example, the gate 662 may be arranged at an entry lane and/or exit lane of a parking area, such as a parking lot, parking garage, or the like. In particular, the illustrated access control system 660 may also be referred to as an access lane system.

The at least one gate 662 is, in particular, a passage barrier 662 in the form of a barrier system 662. The barrier system 662 is in the present case formed by an operating column 668 and a blocking element 666 in the form of a movable barrier arm 666.

Preferably, a fixedly mounted ticket detection device 600 is arranged, in particular, integrated, in the barrier system 662. The barrier system may in turn be fixedly mounted on the ground. A ticket detection device 600 can be formed in particular according to FIG. 1 and/or FIG. 2.

In particular, a camera-based detection equipment 602 and an optical display equipment 606 are shown in FIG. 6.

The camera-based detection equipment 602 is, for example, a lay-on scanner 602. A user can display on his mobile terminal the ticket code to be read, which entitles him to pass through the gate 662, using an installed access application. Then, the user can lay the mobile terminal device on the lay-on scanner 602.

According to the application, the detected image data is displayed respectively reproduced as images in real time on the display equipment 606.

The access control system 660 comprises at least one evaluation equipment (not shown herein). Here, the at least one evaluation equipment may be the (local) evaluation equipment of the previously described ticket detection device 600 or a further evaluation equipment of a (not shown) backend system.

The evaluation equipment may be configured to verify the data content, in particular, an extracted access authorization respectively access codes. In particular, the access authorization can be verified in a conventional manner by said evaluation equipment.

After verifying the extracted data content, in particular, the extracted access authorization, the blocking element 666 can be released, in particular, opened. As has been described, a release equipment can, for example, control an actuator of the gate 662 with a release signal depending on the verification result in order to adjust the blocking element 666 so that the user can pass the gate 662 with his vehicle.

If the check results in a non-authorization of the user to pass the gate 662, the gate 662 may remain blocked.

The access control system 660 may optionally comprise the backend system and/or at least one ticketing medium.

Figure 7:
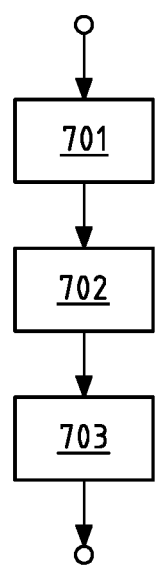

FIG. 7 shows a diagram of an embodiment of a method according to the present application, in particular, for operating a fixedly mounted ticket detection device according to FIG. 1 and/or FIG. 2 or for operating an access control system, in particular, according to FIG. 5 or 6.

In a step 701, a detecting, by at least one camera-based detection equipment, of images of a graphical ticket code of a ticket medium occurs in the detection area of the camera-based detection equipment, and a generating of detected image data from the detected images, as has already been described. In particular, a ticket medium with an optical ticket code held in the detection area is detected respectively recorded.

In a step 702, which can be performed substantially in parallel with step 701, an extracting, by at least one evaluation equipment communicatively coupled to the camera-based detection equipment, of the graphical ticket code of the detected image data occurs, as has already been described. In particular, the data content is extracted from the ticket code contained and recorded in the detected image data.

In a step 703, which may be performed substantially in parallel with steps 701 and 702, a displaying, by at least one optical display equipment communicatively coupled to the camera-based detection equipment, of the image data detected by the camera-based detection equipment occurs as images, as has already been described.

Similarly, a reading process for discount codes or a loyalty card may be performed by a cashier device.

In summary, exemplary problems of the prior art in a reading operation from, for example, a smartphone screen are mentioned below (again):

1. A ticket code must be shown on the display of the ticket medium during the reading process. Accidental app switching, activating the position sensor, accidental scrolling, etc. can cause the barcode to disappear. Depending on the installation position and technology of a prior art barcode reader respectively camera-based detection equipment, this may not be noticed by the user (e.g., with lay-on scanners comparable to airport boarding).
2. The ticket code must be held at the "right place" of the ticket detection device, so that the barcode reader of the ticket detection device can detect the entire ticket code from the screen of the ticket medium. For scanning of (paper-based) ticket codes by means of a hand-held scanner, there are in the prior art for support so-called "Aimer", which image light projections onto the area where the hand-held scanner is reading. However, these "Aimers" are usually not visible on the actively illuminated display of a smartphone.
3. The distance between the ticket code and the barcode reader must match the used technology so that the detected image has sufficient sharpness. This is, in particular, critical with prior art scanner systems, where the ticket medium with the ticket code to be read must be kept at a distance. On-lay scanners are largely unproblematic in this respect, but their size means that they cannot be used for all ticket detection devices (e.g. not for validators).
4. The speed of movement of the ticket medium, from whose screen the ticket code is to be read, must not be too great for a processable image of sufficient sharpness. In this respect, user behavior in the prior art of ticket detection devices is often rather counterproductive: if the reading result is not immediately positive, the ticket medium is moved back and forth, which leads to greater blurring and thus "even more so" to no successful reading process.

5. The brightness and contrast of the barcode displayed on the screen of the user terminal must be sufficient. However, users often reduce the screen brightness to extend battery life.

6. There must be no light reflections on the screen of the user terminal, as this may make parts of the bar code no longer visible to the bar code reader. This can be influenced by the installation situation of the barcode scanner in the ticket detection device. However, the design and size of the ticket detection device often require compromises here.

What is claimed is:

1. A fixedly mounted ticket detection device for an access control system, comprising:
   at least one camera-based detection equipment configured to detect images of a graphical ticket code of a ticket medium in a detection area of the camera-based detection equipment and to generate detected image data from the detected images;
   at least one evaluation equipment communicatively coupled to the camera-based detection equipment and configured at least to obtain the detected image data from the camera-based detection equipment and to extract a data content of the graphical ticket code from the obtained detected image data;
   at least one optical display equipment communicatively coupled to the camera-based detection equipment and configured to obtain the detected image data from the camera-based detection equipment and to display the obtained detected image data as images;
   at least one error evaluation module communicatively coupled to the camera-based detection equipment and configured to determine a presentation error based on the detected image data of the ticket medium and at least one error criterion; and
   (1) at least one error output module communicatively coupled to the error evaluation module and configured to at least cause an outputting, by the ticket detection device, of an error message if a presentation error is determined, and/or
   (2) at least one read confirmation module communicatively coupled to the evaluation equipment and configured to at least cause an outputting, by the ticket detection device, of a read confirmation message if a successful extraction of the data content of the graphical ticket code from the detected image data has taken place.

2. The ticket detection device according to claim 1, wherein
   the optical display equipment is configured to display the image data instantaneously detected by the camera-based equipment as images.

3. The ticket detection device according to claim 1, wherein
   the at least one error criterion is selected from the group comprising:
   ticket code completeness criterion,
   size criterion,
   extraneous light criterion,
   brightness criterion,
   contrast criterion,
   tilt criterion, and
   sharpness criterion.

4. The ticket detection device according to claim 1, wherein the ticket detection device is configured to output a visual signal, an acoustic signal and/or a haptic signal based on a received error message and/or a received read confirmation message.

5. The ticket detection device according to claim 4, wherein
   the optical display equipment is configured to imitate a determined presentation error based on a received error message,
   imitating a determined presentation error comprises, in particular, changing the brightness of the optical display equipment based on a brightness error determined as a presentation error.

6. The ticket detection device according to claim 1, further comprising at least one instruction module communicatively coupled to the error evaluation module and configured to determine at least one outputable user instruction for error recovery based at least on the determined presentation error and a plurality of user instructions stored for the at least one presentation error, wherein the instruction module is configured to cause an outputting of the determined user instruction.

7. The ticket detection device according to claim 1, further comprising at least one near field communication interface communicatively coupled to the error output module and configured to send an error message to the ticket medium in the form of a mobile terminal,
   the error message contains first instructions which, when executed by a processor of the mobile terminal, cause the mobile terminal to output at least a first indication signal, in particular, a first vibration signal.

8. The ticket detection device according to claim 1, further comprising at least one near field communication interface communicatively coupled to the error output module and configured to send a read confirmation message to the ticket medium in the form of a mobile terminal,
   the read confirmation message contains second instructions which, when executed by a processor of the mobile terminal, cause the mobile terminal to output at least a second indication signal, in particular, a second vibration signal,
   in particular the first indication signal is different from the second indication signal.

9. The ticket detection device according to claim 1, further comprising at least one ticket medium detection module coupled to the camera-based detection equipment and configured to detect a presence of a ticket medium in the detection area of the camera-based detection equipment,
   the ticket medium detection module is configured to cause a displaying of the image data detected by the camera-based detection equipment as images only upon detection of the presence of the ticket medium in the detection area of the camera-based detection equipment.

10. The ticket detection device according to claim 1, further comprising at least one release equipment configured to generate a release signal based on an evaluated data content of the graphical ticket code.

11. A method of operating a fixedly mounted ticket detection device according to claim 1, comprising:
    detecting, by at least one camera-based detection equipment, images of a graphical ticket code of a ticket medium in a detection area of the camera-based detection equipment, generating, by the at least one camera-based detection equipment, detected image data from the detected images; and extracting, by at least one evaluation equipment communicatively coupled to the camera-based detection equipment, the graphical ticket code of the detected image data, displaying, by at least one optical display equipment communicatively coupled to the camera-based detection equipment, the image data detected by the camera-based detection equipment as images.

12. An access control system for a passenger transportation system or a parking system, comprising:

at least one ticket detection device according to claim 1 communicatively coupled to at least one gate, wherein the access control system comprises at least one release equipment communicatively coupled to an evaluation equipment and configured to generate a release signal based on an evaluated data content of an extracted graphical ticket code, and the gate is configured to enable a passaging through the gate based on an obtained release signal.

\* \* \* \* \*